United States Patent [19]

Koller et al.

[11] 4,157,864
[45] Jun. 12, 1979

[54] CONTACT LENS EYEBALL CENTERING SUPPORT OF SOFT MATERIAL FOR USE IN CONJUNCTION WITH HARD CONTACT LENS

[76] Inventors: Bruno Koller, Hasengasse 23; Friedrich Kilb, Scheidwald Str. 43, both of 6 Frankfurt am Main, Fed. Rep. of Germany

[21] Appl. No.: 771,646

[22] Filed: Feb. 28, 1977

[51] Int. Cl.² .............................................. G02C 7/04
[52] U.S. Cl. .............................................. 351/160 H
[58] Field of Search ........................... 351/160, 160 H

[56] References Cited
U.S. PATENT DOCUMENTS 3,619,044   11/1971   Kamath ................................ 351/160

FOREIGN PATENT DOCUMENTS 2309933   9/1974   Fed. Rep. of Germany ........... 351/160
2556658   6/1976   Fed. Rep. of Germany ........... 351/160

Primary Examiner—John K. Corbin
Assistant Examiner—Scott J. Sugarman

[57] ABSTRACT

A contact lens eyeball centering support of soft material for use in conjunction with hard corneal contact lenses. The support has the form and the material of a soft contact lens and is characterized by the fact that the central optical part is absent, to create a free opening without usual system. A hard corneal contact lens can, when the support is in position on the eye, be positioned into the free central opening without adhesion. The preferred embodiment of the lens eyeball centering support of soft material has an external diameter of approximately 15 mm and an internal diameter that corresponds approximately to the diameter of a standard commercial corneal hard contact lens.

2 Claims, 1 Drawing Figure

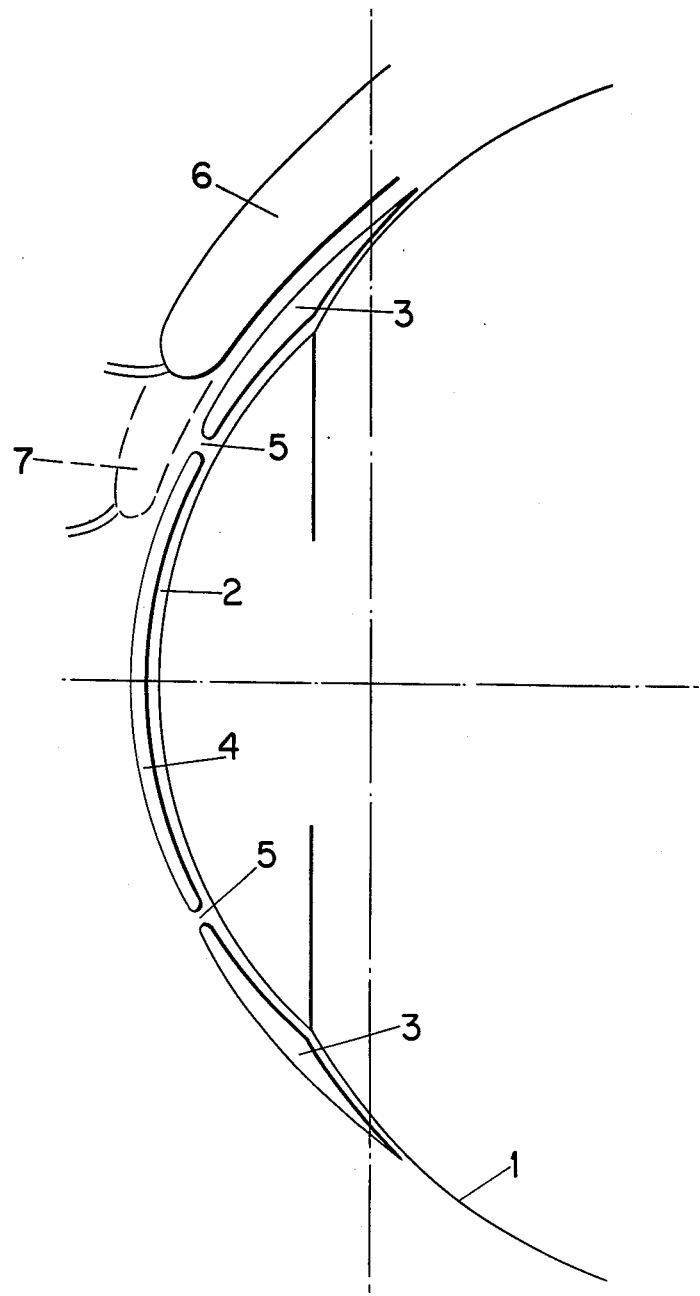

CONTACT LENS EYEBALL CENTERING SUPPORT OF SOFT MATERIAL FOR USE IN CONJUNCTION WITH HARD CONTACT LENS

BACKGROUND OF THE INVENTION

The invention refers to an aid for wearing the hard corneal contact lenses commercially available on the eyeballs.

If a soft contact lens does not yield sufficient visual acuity because it adapts to the deformed cornea, it is necessary to use a hard contact lens instead of a soft one. However, the hard contact lens is not compatible enough in many cases, since it causes pressure sores and abrasions on the outward parts of the cornea, or it does not align centrally on the cornea.

There is already a corneal contact lens known, which is made of hydrophil plastic gels, in the center of which there is an adaptor of hard plastics is pasted, cemented or welded. Such contact lenses must have a certain minimum thickness at their junction, which, however, is too high for most applications. They will easily break at the junction, causing an injury hazard for the cornea, tending to develop pressure sores, eye redness and hypometabolism. Apart from this, it is hardly or even not at all possible to connect the central solid plastics with the outward soft plastics.

It is much more advisable to manufacture soft contact lenses whose central optical part is stiffer. However, in practice such lenses are not used since there are unsolvable problems connected to them. For instance, they will deform on the eye because the central part is not quite hard enough.

SUMMARY OF THE INVENTION

The invention is based on the task to show a way how to render higher compatibility and better centering to hard corneal contact lenses commercially available.

This task is, in the present invention, performed by a centering support which outside the center shows the form and material of a large, soft contact lens in relation to the hard contact lens, but which does not have any central optical part as compared with such a soft contact lens; it exhibits a central, continuous opening without any groove system, which has about the diameter of the hard contact lens and into which the hard contact lens can be dabbed when adhering to the eye, without having any fixed connection to the edge of the opening.

This centering support is worn together with the hard contact lens. It serves for centering conventional hard contact lenses on the cornea of a human eye and for increasing the compatibility of such a hard contact lens. The centering support is suitable for all hard lens models. Therefore, the present invention combines good compatibility typical for soft contact lenses with permanently good visual acuity as that of hard lenses.

The most important feature is the fact that both components, namely the hard contact lens and the centering support are neither pasted, fused nor connected to each other via a groove system, but stick to the eye separately just by adhesion.

BRIEF DESCRIPTION OF THE DRAWING

The FIGURE is a side schematic illustration with parts thereof in section of the combination of a hard contact lens and a soft contact lens support of the invention positioned on a human eyeball.

DESCRIPTION OF A PREFERRED EMBODIMENT

The centering support 3 has a central opening 2 from its top surface right down to its bottom surface, into which the hard contact lens 4 is inserted with free axial mobility on a human eyeball 1. Therefore, the opening does not need to be thicker at the edge than normal hard contact lenses. There is no possibility for a junction to break so that a resulting injury hazard is positively eliminated. The junction will not lead to any corneal irritation either; on the contrary, the centering support and the hard contact lens can be adapted to the eyeball individually. The gap 5 between the central opening 2 and the hard contact lens 4 permits the tear film to flow outward, improving metabolism below the foreign substance considerably and preventing any eye redness to develop. The hard contact lenses can be adapted as usual. Should these prove incompatible after a certain time or slip away frequently, this disadvantage can be remedied immediately by using the central support 3. The central support may be retained even if a different hard contact lens having other optical properties has to be used.

Centering supports with approximately 15 mm outside diameter have proved particularly useful. For hard contact lenses commercially available, having a diameter of approximately 8mm, this corresponds to nearly the double size.

When placing the centering support on the eye, the conventional hard contact lens can be dabbed into the central opening 2. The hard lens now assumes the function of visual acuity correction, even if the cornea underneath is severely deformed. The hard contact lens can no longer gloat away to the corneal edge because the securely seated centering support located the hard contact lens accurately in front of the pupil. On their surfaces, both the centering support and the hard contact lens form a smooth transition so that the edge of the hard contact lens is no longer present as an obstacle and causes an unpleasant feeling when blinking the eyelid 6. Consequently, the hard contact lens does not need to be adapted too tightly. This facilitates tear passage underneath the contact lens and takes care to the corneal tissue. The centering support so assumes the function of improved compatibility and centering of the hard lens. Thus, the centering support cannot be deemed a contact lens but an aid for the hard contact lens.

In a preferred design example, the centering support made of soft material has an outside diameter of approximately 15 mm, while the diameter of the central opening is about 8.5 up to 9.5 mm, as desired. The material thickness in the opening is approximately 0.3 mm declining towards the edge to approximately 0.1 mm. The inside and outside curves are pre-shaped corresponding to the shape of the eye. As the centering support is soft, it is capable of adapting itself to a great extent to the shape of the eye, ensuring that no pressure sore can develop.

We claim:

1. An aid for wearing a hard corneal contact lens comprising a centering support to be worn on a human eye and having a shape conforming to the curvature thereof, said support formed from a soft contact lens material, said support further having means forming a central opening in the support with a diameter which corresponds substantially to the diameter of a hard contact lens, whereby a hard contact lens can be independently inserted into the opening to adhere to an eye without being affixed to the support.

2. An aid according to claim 1, characterized by the outside diameter of the centering support being approximately 15 mm.

* * * * *